(12) United States Patent
Stewart et al.

(10) Patent No.: US 7,613,561 B1
(45) Date of Patent: Nov. 3, 2009

(54) MEASUREMENT OF NO AND $NO_2$ FOR CONTROL OF SELECTIVE CATALYTIC REDUCTION

(75) Inventors: Gregory E. Stewart, North Vancouver (CA); David Germann, North Vancouver (CA)

(73) Assignee: Honeywell International Inc, Morristown, NJ (US)

( * ) Notice: Subject to any disclaimer, the term of this patent is extended or adjusted under 35 U.S.C. 154(b) by 30 days.

(21) Appl. No.: 12/109,281

(22) Filed: Apr. 24, 2008

(51) Int. Cl.
*B01D 53/34* (2006.01)
*G06F 19/00* (2006.01)
*C01B 21/00* (2006.01)

(52) U.S. Cl. .................. 701/109; 423/237
(58) Field of Classification Search .......... 701/109, 701/108, 102; 423/235, 237, 212
See application file for complete search history.

(56) References Cited

U.S. PATENT DOCUMENTS 4,076,792 A * 2/1978 Foster et al. ............. 423/213.5

FOREIGN PATENT DOCUMENTS

JP 6-343877 A * 12/1994
JP 2006-57576 A * 3/2006

OTHER PUBLICATIONS

Chen, Ming, et al., "Modelling and Optimization of SCR-Exhaust Aftertreatment Systems", *SAE 2005-01-0969*, SAE International Paper,(2005),1-11.
Chi, John N., et al., "Modelling and Control of a Urea-Scr Aftertreatment System", *SAE 2005-01-0966*, SAE International Paper,(2005),1-18.
Majewski, W. A., "SCR Systems for Mobile Engines", www.dieselnet.com, (2005).
Schar, C. M., et al., "Control of an SCR catalytic converter system for a mobile heavy-duty application", *IEEE Transactions on Control Systems Technology*, 14(4), (Jul. 2006),641-653.
Van Helden, Rinie, et al., "Optimization of Urea Scr Denox Systems for Hd Diesel Engines", *SAE 2004-01-0154*, SAE International Paper,(Mar. 2004),1-15.

* cited by examiner

*Primary Examiner*—Hieu T Vo
(74) *Attorney, Agent, or Firm*—Kris T. Fredrick

(57) ABSTRACT

A selective catalytic reduction system includes a catalyst, a device to measure an amount of nitrogen oxide (NO), a device to measure an amount of nitrogen dioxide ($NO_2$), a device to add an ammonia source, and a control unit to calculate the amount of ammonia source to add as a function of a ratio of an amount of nitrogen oxide and an amount of nitrogen dioxide or an absolute amount of nitrogen oxide and an absolute amount of nitrogen dioxide.

20 Claims, 4 Drawing Sheets

MEASUREMENT OF NO AND NO₂ FOR CONTROL OF SELECTIVE CATALYTIC REDUCTION

TECHNICAL FIELD

Various embodiments relate to selective catalytic reduction systems, and in an embodiment, but not by way of limitation, to the measurement of nitrogen oxide and nitrogen dioxide in the control of such selective catalytic reduction systems.

BACKGROUND

Selective Catalytic Reduction (SCR) systems normally receive as input a gas, and catalytically convert undesirable components in that gas into less noxious components. An example of such an SCR system is a catalytic reduction system in a diesel engine powered vehicle. One aspect of an SCR system is the conversion of nitrogen oxide (NO) and nitrogen dioxide ($NO_2$) into nitrogen and water. In such SCR systems, a urea solution (which converts to ammonia—$NH_3$) or other ammonia source is used to react with the nitrogen oxide and nitrogen dioxide. It is known that dosing the urea so that the ammonia is in a 1:1 ratio with the combined amount of both the nitrogen oxide and the nitrogen dioxide (referred to in the art as $NO_x$) is conducive to the effectiveness of the system.

DETAILED DESCRIPTION

Figure 1:
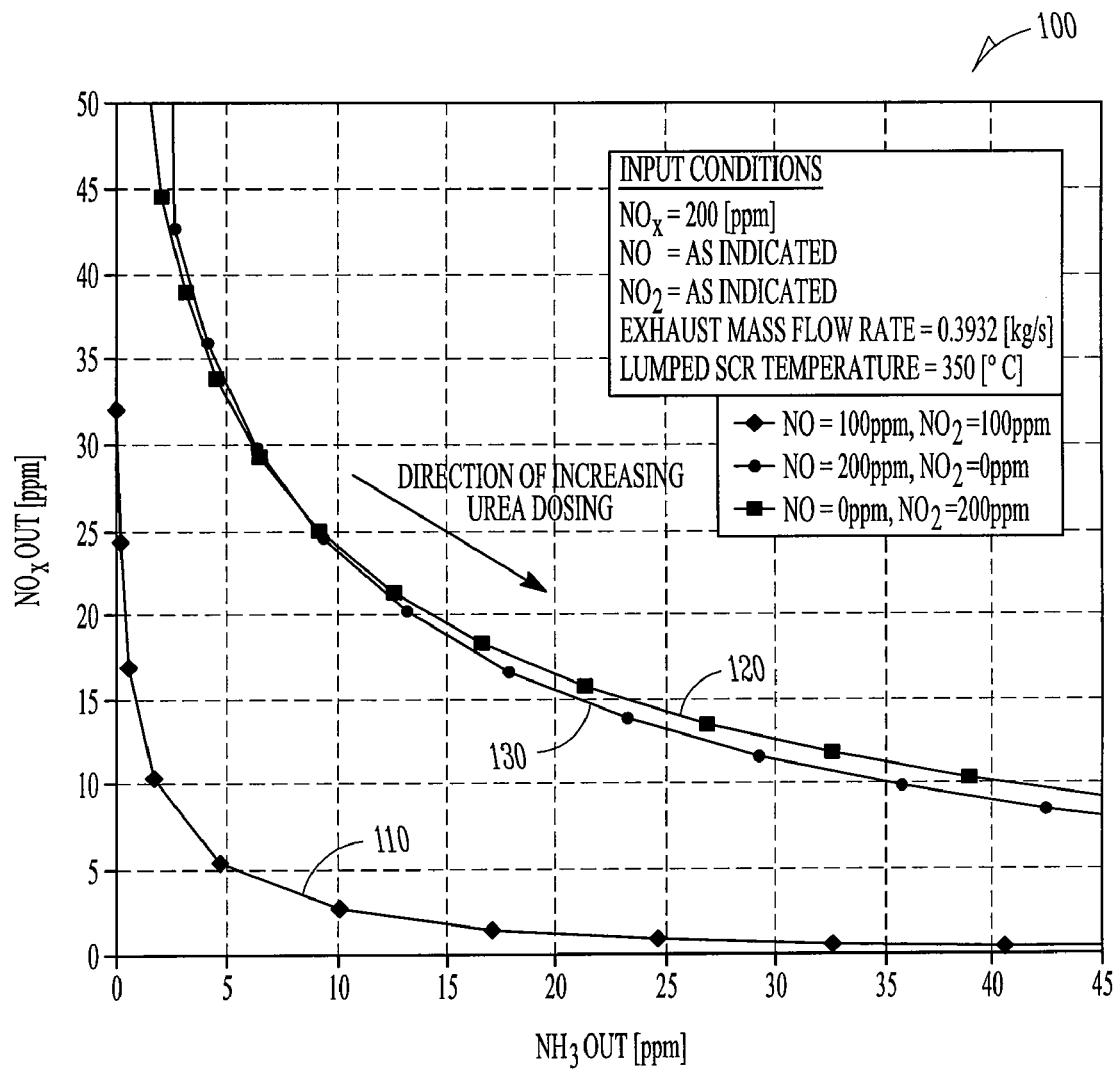
FIG. 1 is a graph illustrating the different reaction behavior of $NO_x$ as a function of the composition of $NO_x$ (i.e., the ratio of NO and $NO_2$).

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Embodiments of the invention include features, methods or processes embodied within machine-executable instructions provided by a machine-readable medium, such as an in electronic control unit (ECU). A machine-readable medium includes any mechanism which provides (i.e., stores and/or transmits) information in a form accessible by a machine (e.g., a computer, a network device, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include digital/analog signal processing systems, software, data processing hardware, data processing system-implemented methods, and various processing operations, further described herein. As used herein, the term processor means one or more processors, and one or more particular processors can be embodied on one or more processors.

One or more figures show block diagrams of systems and apparatus of embodiments of the invention. One or more figures show flow diagrams illustrating systems and apparatus for such embodiments. The operations of the one or more flow diagrams will be described with references to the systems/apparatuses shown in the one or more block diagrams. However, it should be understood that the operations of the one or more flow diagrams could be performed by embodiments of systems and apparatus other than those discussed with reference to the one or more block diagrams, and embodiments discussed with reference to the systems/apparatus could perform operations different than those discussed with reference to the one or more flow diagrams.

In an embodiment, in a Selective Catalytic Reduction (SCR) system, the molar flows (e.g., moles/sec) of nitrogen oxide (NO) and nitrogen dioxide ($NO_2$) are determined and/or measured, and a dosing of a urea solution is metered based on these molar flows of nitrogen oxide and nitrogen dioxide. While it is generally more practical to dose a urea solution, in other embodiments, other ammonia sources could be used, including the direct injection of ammonia into the SCR system.

Specifically, the SCR system takes into account the molar flows of nitrogen oxide and nitrogen dioxide molecules that are available for a standard reaction and a fast reaction in a catalyst. There is also another reaction, besides the standard reaction and the fast reaction, referred to as a slow SCR reaction in which only $NO_2$ is converted. However, as the name indicates, the slow SCR reaction is very slow, has only a minor effect on the overall $NO_x$ conversion rate, and therefore will not be discussed further. The fast SCR reaction (Equation No. 1) and the standard SCR reaction (Equation No. 2) and can be represented by the following equations:

$$4NH_3 + 2NO + 2NO_2 \rightarrow 4N_2 + 6H_2O \quad (1)$$

$$4NH_3 + 4NO + O_2 \rightarrow 4N_2 + 6H_2O \quad (2)$$

As can be seen from Equation Nos. (1) and (2), the fast SCR reaction uses NO and $NO_2$ in a 1:1 ratio, and the standard SCR reaction uses NO alone. Further, as can be surmised from the nomenclature, the fast SCR reaction proceeds at a faster reaction rate than the standard SCR reaction. Even though both the fast and standard SCR reactions use the same number of molecules of $NO_x$, ($NO_x$ being a notation used to represent the total amount of both NO and $NO_2$ in a system), due to its faster reaction rate, the fast SCR reaction, which consumes equal parts of NO and $NO_2$, is much more effective than the standard SCR reaction, which consumes only NO. Since the fast SCR reaction requires $NO_2$, it is the amount of $NO_2$ in a system that determines the predominance or lack of predominance of the fast SCR reaction in a particular system. Moreover, since the fast SCR reaction proceeds at a faster rate than the standard SCR reaction (for a particular exhaust gas flow rate, temperature, and ammonia coverage), the greater the percentage of the fast SCR reaction, the more ammonia will be consumed, and the more urea solution that can be dosed into the system. Therefore, since the amount of nitrogen dioxide determines the presence of the fast SCR reaction, it is a ratio of NO and $NO_2$ (or the absolute amount of NO and $NO_2$) that determines an effective reaction rate. And further since the urea dosing depends on an effective reaction rate (because one can use more urea solution if the fast SCR reaction predominates thereby making the effective reaction rate faster), then an improved SCR system bases urea solution dosing on a ratio of NO and $NO_2$ (or the absolute amount of NO and $NO_2$), not simply the combined amount of NO and $NO_2$ (i.e., $NO_x$). A result of such a dosing scheme is that the system avoids both excessive $NO_x$ emissions (indicating too light of a urea solution dosage) or excess ammonia slip (indicating too heavy a urea solution dosage).

The basis for dosing a urea solution in a catalytic reduction system based on a ratio of NO and $NO_2$ in the system is graphically depicted in FIG. 1. FIG. 1 is a graph 100 primarily illustrating a relationship between a ratio of $NO:NO_2$ in a system and the effectiveness of the removal of the $NO_x$ from that system. As noted above, other factors beside the ratio of $NO:NO_2$ that affect the removal of $NO_x$ from a system include the flow rate of the exhaust gases, the temperature of the exhaust gases, and the theta value of the catalyst. The theta value of the catalyst is a measure of the ammonia coverage of the catalyst, that is, the percentage of reaction sites in the catalyst that have an ammonia molecule adsorbed onto them. A theta value of 1 indicates that all of the reactions sites in the catalyst have an ammonia molecule adsorbed onto them; a theta value of 0 indicates that none of the reaction sites in the catalyst have an ammonia molecule adsorbed onto them. As is known in the art, the higher the temperature of the exhaust gases and the higher the theta value, then the greater the amount of NO and $NO_2$ that will react with $NH_3$ in the catalyst. As is also known in the art, the faster the flow rate of the exhaust gases in a system, then the smaller the residence time that an $NO_x$ molecule will be inside the catalyst, and the smaller the amount of $NO_x$ molecules that will react in the system and hence be converted into nitrogen and water.

It is a common strategy in such SCR systems to select an acceptable ammonia slip (which, for example, may be dictated by governmental regulations), and then dose the urea solution such that the system does not exceed that ammonia slip. For example, referring back to FIG. 1, if the permissible ammonia slippage is 20 ppm, FIG. 1 illustrates that when the $NO:NO_2$ ratio is 1:1 at the inlet of an SCR device, the excess $NO_x$ ($NO_x$ OUT) is minimized as illustrated by line 110. However, as further illustrated in FIG. 1, when there is either nitrogen oxide but no nitrogen dioxide, or when there is nitrogen dioxide but no nitrogen oxide, the excess $NO_x$ is at a much higher level (120, 130). Specifically, at an ammonia slip of 20 ppm, line 110 shows an $NO_x$ emission downstream of the catalyst of roughly 2 ppm. For the given inlet exhaust gas with 200 ppm $NO_x$, this means that 198 ppm $NO_x$ has been converted. Since the fast and standard SCR reactions both use up one ammonia molecule per converted $NO_x$ particle, this implies that 198 ppm $NH_3$ has been used up. Assuming constant ammonia coverage in the catalyst and the ammonia slip of 20 ppm, this amounts to 218 pmm of ammonia participating in the process. The same calculation for line 130 amounts to roughly 204 ppm of $NH_3$ which shows that the ideal injection amount of urea or ammonia clearly depends on the composition of the $NO_x$ inside the exhaust gas flowing into the catalyst. While FIG. 1 illustrates only three ratios of $NO:NO_2$, of course many other ratios of $NO:NO_2$ could be added to FIG. 1, thereby generating a model of the excess $NO_x$ out for many different ratios of $NO:NO_2$ for the particular exhaust gas flow rate and temperature of FIG. 1. Additionally, similar models could be generated for many other temperature, exhaust gas flow rate, and ammonia coverage conditions. The arrow in FIG. 1 shows that a different urea solution dosing is required to achieve 20 ppm $NH_3$ slip depending on a ratio of NO and $NO_2$ in the system.

Figure 3:
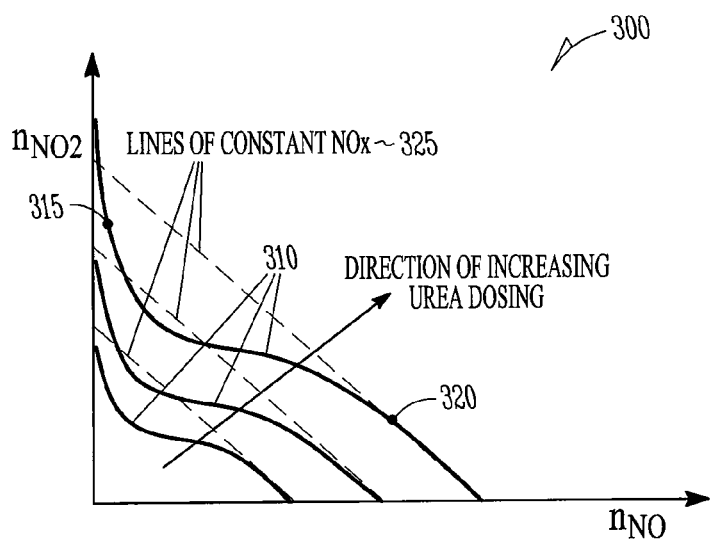
FIG. 3 is a graph (model) illustrating an example of a relationship between urea dosing and molar flows (moles/sec) of nitrogen oxide and nitrogen dioxide.

The models of FIG. 1 can be represented as a plurality of contour maps, an example of which is illustrated in FIG. 3. The example contour map or model 300 of FIG. 3 is for a particular ammonia slip at particular system conditions (temperature, exhaust gas flow rate, and ammonia coverage). The asymmetry of the contour indicates that different amounts of urea solution are required to achieve constant ammonia slip depending on the amounts of NO and $NO_2$ entering the SCR catalyst. Such a contour model 300 can be stored into an electronic control unit, and the electronic control unit can be coupled to a device to control the dosage of urea as a function of the amounts of nitrogen oxide and nitrogen dioxide in the system. Specifically, the lines 310 of model 300 represent different levels of urea solution dosing as indicated by the arrow in FIG. 3, and the proper level of urea dosing for a particular level of NO and $NO_2$ can be determined from the model 300. Also built into the model 300, from the experimental conditions that generated the model, are the relative levels of the standard and fast SCR reactions. Specifically, for a particular level of urea dosing, the point 315 on the model 300 indicates that there is a higher level of fast reactions (because there is a relatively high level of $NO_2$ available for the fast SCR reaction), and point 320 indicates that there is a relatively higher level of standard SCR reactions (because there is relatively little $NO_2$ available for the fast SCR reaction).

Figure 2:
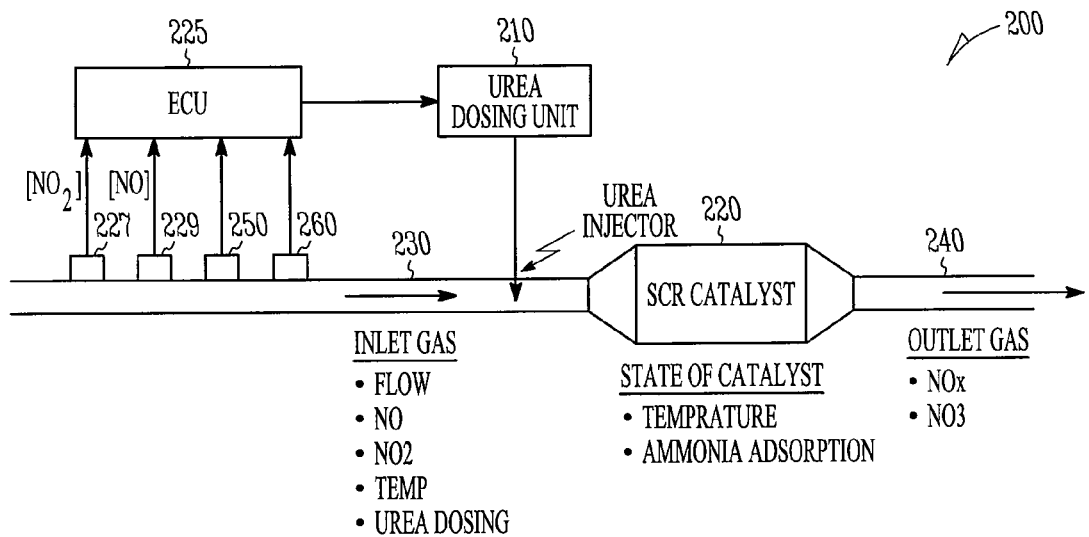
FIG. 2 illustrates an example embodiment of a feed-forward Selective Catalytic Reduction (SCR) system.

FIG. 2 illustrates in block diagram form an example embodiment of a selective catalytic reduction system 200 that can be used to implement the selective catalytic reduction as described above based in part on a ratio of NO and $NO_2$. The system 200 is illustrative of a system that could be used in connection with a diesel engine powered vehicle. The system 200 includes a urea dosing unit 210, a selective reduction catalyst (SCR) 220, an electronic control unit (ECU) 225, a nitrogen oxide sensor 227, a nitrogen dioxide sensor 229, inlet and outlet pipes 230 and 240 to the SCR unit respectively, a flow meter 250, and a temperature sensor 260. As further indicated in FIG. 2, in a diesel engine environment, the inlet gas in the pipe 230 includes nitrogen oxide and nitrogen dioxide, and the effectiveness of the system is influenced by such things as flow, temperature, and urea solution dosing. The state of the catalyst 220 is a function of temperature and ammonia adsorption. The outlet gases in pipe 240 can include ammonia ($NH_3$), nitrogen oxide, and nitrogen dioxide (the nitrogen oxide and nitrogen dioxide collectively represented by $NO_x$). Some examples of a catalyst that can serve as an SCR catalyst include an extruded monolithic converter or a coated cordierite honeycomb using titanium dioxide, aluminum oxide, or silicon dioxide as a catalytic material.

The nitrogen dioxide sensor 227 and the nitrogen oxide sensor 229 sense the levels of nitrogen oxide and nitrogen dioxide respectively in the inlet pipe 230. In other systems in which the SCR catalyst includes an oxidation catalyst (which affects the levels of NO and $NO_2$), the NO and $NO_2$ sensors can be placed in the SCR catalyst, or the model to determine the dosing takes into account the presence of the oxidation catalyst in the SCR catalyst. The determination of nitrogen oxide and nitrogen dioxide can be done either directly, or indirectly (e.g., by measuring NO and $NO_x$, and then calculating $NO_2$ by determining the difference between the $NO_x$ and the NO). This data is transmitted to the ECU 225, along with flow data from the flow meter 250 and temperature data from the temperature sensor 260. The ECU 225 analyzes this data as a function of the rate of flow of the exhaust gases, the temperature of the exhaust gases in the inlet pipe 230, the ammonia coverage of the SCR catalyst, and the molar flow of NO (moles/s) and the molar flow of $NO_2$ (moles/s), and signals the urea dosing unit 210 the amount of urea solution to add to the system.

The determination of nitrogen oxide and nitrogen dioxide could also be done by using two sensors that have dissimilar sensitivities and cross-sensitivities, as is disclosed in U.S. patent application Ser. No. 11/725,941 ("the '941 application"), filed on Mar. 19, 2007, and entitled METHOD AND SYSTEM FOR THE SIMULTANEOUS MEASUREMENT OF A PLURALITY OF PROPERTIES ASSOCIATED WITH AN EXHAUST GAS MIXTURE, which is hereby incorporated by reference. The '941 application discloses that signals from a plurality of sensors that are cross-sensitive to a first property (e.g. $NO_x$) and a second property (e.g. $NH_3$) can be combined. A decoupling observer algorithm can be applied, such that these cross-sensitivities are decoupled and the sensors simultaneously obtain an estimate of one or more such properties. Such a method and system can enable the use of inexpensive sensor technologies that have been previously ruled out due to their cross-sensitivities. Possible configurations utilizing such sensors and a decoupling observer algorithm can include, for example, control module (ECM) based configurations, intelligent sensor configurations, and/or intelligent sensor configuration for on board diagnostics.

Figure 4:
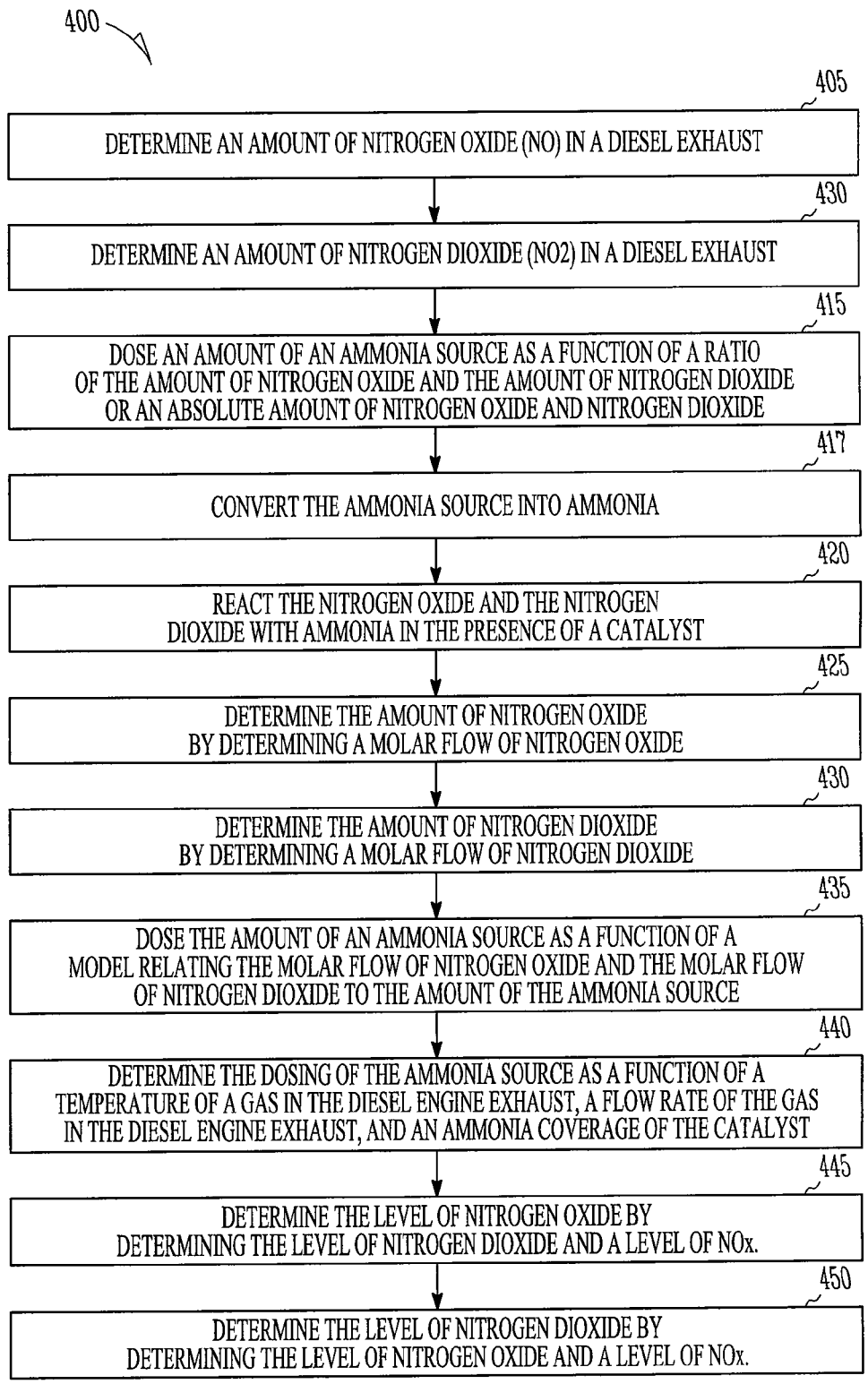
FIG. 4 is a flowchart illustrating an example embodiment of a feed-forward process in a Selective Catalytic Reduction (SCR) system.

FIG. 4 is a flowchart of an example process 400 for dosing an amount of urea solution to react with diesel engine exhaust as a function of a ratio of nitrogen oxide and nitrogen dioxide or an absolute amount of nitrogen oxide and an absolute amount of nitrogen dioxide. FIG. 4 includes a number of process blocks 405-450. Though arranged serially in the example of FIG. 4, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIG. 4, at 405, an amount of nitrogen oxide (NO) in a diesel engine exhaust is determined. At 410, an amount of nitrogen dioxide ($NO_2$) in the diesel engine exhaust is determined. At 415, an amount of an ammonia source is dosed as a function of a ratio of the amount of nitrogen oxide and the amount of nitrogen dioxide or an absolute amount of nitrogen oxide and an absolute amount of nitrogen dioxide. At 417, the ammonia source is converted into ammonia. At 420, the nitrogen oxide and the nitrogen dioxide are reacted with ammonia in the presence of a catalyst. At 425, the amount of nitrogen oxide is determined by determining a molar flow of nitrogen oxide. At 430, the amount of nitrogen dioxide is determined by determining a molar flow of nitrogen dioxide. At 435, the amount the ammonia source is dosed as a function of a model relating the molar flow of nitrogen oxide and the molar flow of nitrogen dioxide to the amount of the ammonia source. At 440, the dosing an amount of an ammonia source is determined as a function of a temperature of a gas in the diesel engine exhaust, a flow rate of a gas in the diesel engine exhaust, and an ammonia coverage of the catalyst. At 445, the level of nitrogen oxide is determined by determining the level of nitrogen dioxide and a level of $NO_x$. At 450, the level of nitrogen dioxide is determined by determining the level of nitrogen oxide and a level of $NO_x$.

Figure 5:
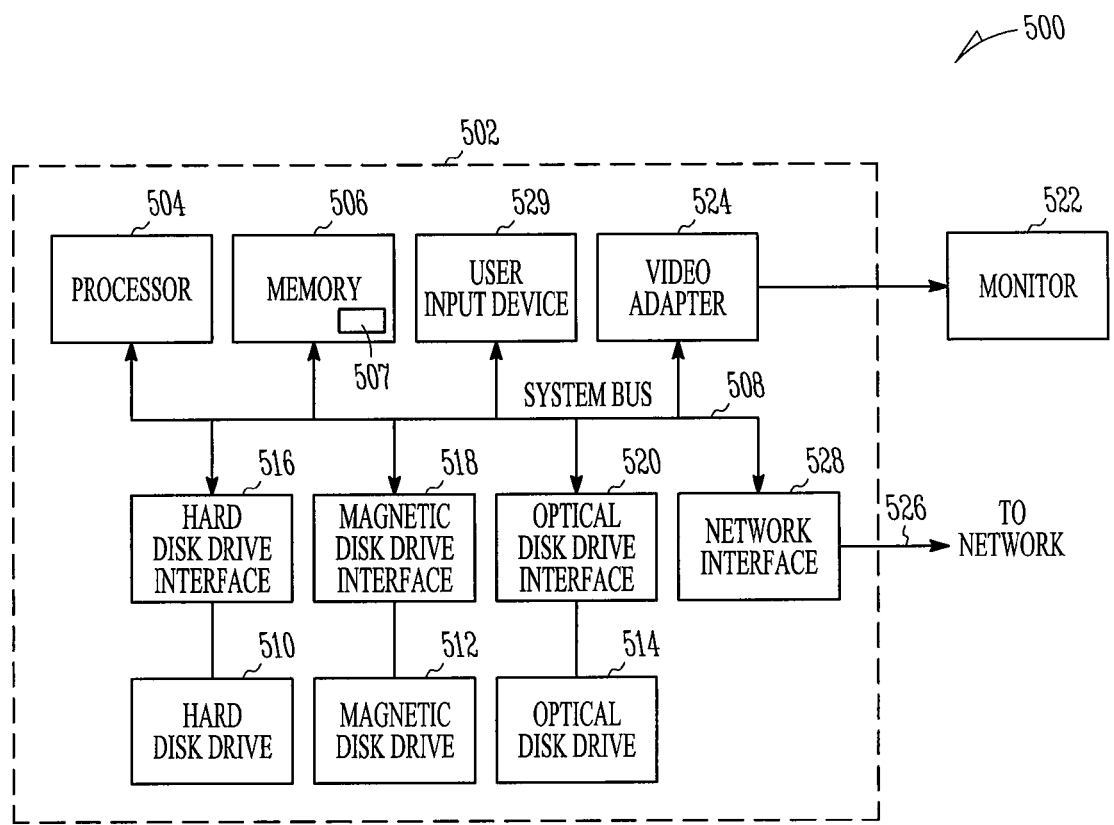
FIG. 5 is a block diagram of an example processor-based system that can be used in connection with the current disclosure.

FIG. 5 illustrates a block diagram of a data-processing apparatus 500, which can be adapted for use in implementing a preferred embodiment. It can be appreciated that data-processing apparatus 500 represents merely one example of a device or system that can be utilized to implement the methods and systems described herein. Other types of data-processing systems can also be utilized to implement the present invention. Data-processing apparatus 500 can be configured to include a general purpose computing device 502. The computing device 502 generally includes a processing unit 504, a memory 506, and a system bus 508 that operatively couples the various system components to the processing unit 504. One or more processing units 504 operate as either a single central processing unit (CPU) or a parallel processing environment. A user input device 529 such as a mouse and/or keyboard can also be connected to system bus 508.

The data-processing apparatus 500 further includes one or more data storage devices for storing and reading program and other data. Examples of such data storage devices include a hard disk drive 510 for reading from and writing to a hard disk (not shown), a magnetic disk drive 512 for reading from or writing to a removable magnetic disk (not shown), and an optical disk drive 514 for reading from or writing to a removable optical disc (not shown), such as a CD-ROM or other optical medium. A monitor 522 is connected to the system bus 508 through an adaptor 524 or other interface. Additionally, the data-processing apparatus 500 can include other peripheral output devices (not shown), such as speakers and printers.

The hard disk drive 510, magnetic disk drive 512, and optical disk drive 514 are connected to the system bus 508 by a hard disk drive interface 516, a magnetic disk drive interface 518, and an optical disc drive interface 520, respectively. These drives and their associated computer-readable media provide nonvolatile storage of computer-readable instructions, data structures, program modules, and other data for use by the data-processing apparatus 500. Note that such computer-readable instructions, data structures, program modules, and other data can be implemented as a module 507. Module 507 can be utilized to implement the methods depicted and described herein. Module 507 and data-processing apparatus 500 can therefore be utilized in combination with one another to perform a variety of instructional steps, operations and methods, such as the methods described in greater detail herein.

Note that the embodiments disclosed herein can be implemented in the context of a host operating system and one or more module(s) 507. In the computer programming arts, a software module can be typically implemented as a collection of routines and/or data structures that perform particular tasks or implement a particular abstract data type.

Software modules generally comprise instruction media storable within a memory location of a data-processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product that can be implemented through signal-bearing media, including transmission media and recordable media.

It is important to note that, although the embodiments are described in the context of a fully functional data-processing apparatus such as data-processing apparatus 500, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

Any type of computer-readable media that can store data that is accessible by a computer, such as magnetic cassettes, flash memory cards, digital versatile discs (DVDs), Bernoulli cartridges, random access memories (RAMS), and read only memories (ROMs) can be used in connection with the embodiments.

A number of program modules, such as, for example, module 507, can be stored or encoded in a machine readable medium such as the hard disk drive 510, the, magnetic disk drive 512, the optical disc drive 514, ROM, RAM, etc. or an electrical signal such as an electronic data stream received through a communications channel. These program modules can include an operating system, one or more application programs, other program modules, and program data.

The data-processing apparatus 500 can operate in a networked environment using logical connections to one or more remote computers (not shown). These logical connections can be implemented using a communication device coupled to or integral with the data-processing apparatus 500. The data sequence to be analyzed can reside on a remote computer in the networked environment. The remote computer can be another computer, a server, a router, a network PC, a client, or a peer device or other common network node. FIG. 5 depicts the logical connection as a network connection 526 interfacing with the data-processing apparatus 500 through a network interface 528. Such networking environments are commonplace in office networks, enterprise-wide computer networks, intranets, and the Internet, which are all types of networks. It will be appreciated by those skilled in the art that the network connections shown are provided by way of example and that other means and communications devices for establishing a communications link between the computers can be used.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

The invention claimed is:

1. An apparatus comprising:
    a device to determine an amount of nitrogen oxide (NO) in a diesel engine exhaust;
    a device to determine an amount of nitrogen dioxide ($NO_2$) in the diesel engine exhaust; and
    a control unit to calculate an amount of an ammonia source to add as a function of a ratio of the amount of nitrogen oxide and the amount of nitrogen dioxide, or as a function of an absolute amount of nitrogen oxide and an absolute amount of nitrogen dioxide.

2. The apparatus of claim 1, comprising a device to add the amount of the ammonia source, based on input from the control unit, to react with the nitrogen oxide and nitrogen dioxide in the presence of a catalyst.

3. The apparatus of claim 1, wherein the system is coupled to a diesel engine and the ammonia source comprises urea.

4. The apparatus of claim 2, comprising:
    a device to determine a temperature of the diesel engine exhaust;
    a device to determine a flow rate of the diesel engine exhaust; and
    the catalyst.

5. The apparatus of claim 4, wherein the control unit is configured to calculate the amount of the ammonia source to add as a function of the temperature of the diesel engine exhaust, the flow rate of the diesel engine exhaust, and an ammonia coverage of the catalyst.

6. The apparatus of claim 2, wherein the device to determine an amount of nitrogen oxide and the device to determine an amount of nitrogen dioxide are upstream of the device to add an amount of an ammonia source, and the device to add an amount of an ammonia source is upstream of the catalyst.

7. The apparatus of claim 1, wherein the control unit comprises one or more models relating to:
    the ratio of an amount of nitrogen oxide and an amount of nitrogen dioxide or the absolute amount of nitrogen oxide and the absolute amount of nitrogen dioxide; and
    the amount of the ammonia source to add.

8. A process comprising:
    determining an amount of nitrogen oxide (NO) in a diesel engine exhaust;
    determining an amount of nitrogen dioxide ($NO_2$) in the diesel engine exhaust;
    dosing an amount of an ammonia source as a function of a ratio of the amount of nitrogen oxide and the amount of nitrogen dioxide or as a function of an absolute amount of nitrogen oxide and an absolute amount of nitrogen dioxide;
    converting the ammonia source into ammonia; and
    reacting the nitrogen oxide and the nitrogen dioxide with the ammonia in the presence of a catalyst.

9. The process of claim 8, comprising determining the amount of nitrogen oxide by determining a molar flow of nitrogen oxide, and determining the amount of nitrogen dioxide by determining a molar flow of nitrogen dioxide.

10. The process of claim 9, comprising dosing the amount of the ammonia source as a function of a model relating the molar flow of nitrogen oxide and the molar flow of nitrogen dioxide to the amount of the ammonia source.

11. The process of claim 8, comprising determining the dosing an amount of the ammonia source as a function of a temperature of the diesel engine exhaust, a flow rate of the diesel engine exhaust, and an ammonia coverage of the catalyst.

12. The process of claim 8, comprising determining the amount of nitrogen oxide by determining the amount of nitrogen dioxide and an amount of $NO_x$.

13. The process of claim 8, comprising determining the amount of nitrogen dioxide by determining the amount of nitrogen oxide and an amount of $NO_x$.

14. A machine readable medium comprising instructions that when executed by a processor executes a process comprising:
   determining an amount of nitrogen oxide (NO) in a diesel engine exhaust;
   determining an amount of nitrogen dioxide ($NO_2$) in the diesel engine exhaust; and
   dosing an amount of an ammonia source as a function of a ratio of the amount of nitrogen oxide and the amount of nitrogen dioxide or an absolute amount of the nitrogen oxide and an absolute amount of the nitrogen dioxide;
   whereby the ammonia source is converted into ammonia; and
   whereby the nitrogen oxide and the nitrogen dioxide react with the ammonia in the presence of a catalyst.

15. The machine readable medium of claim 14, comprising instructions to determine the amount of nitrogen oxide by determining a molar flow of nitrogen oxide, and determining the amount of nitrogen dioxide by determining a molar flow of nitrogen dioxide.

16. The machine readable medium of claim 15, comprising instructions to dose the amount of the ammonia source as a function of a model relating the molar flow of nitrogen oxide and the molar flow of nitrogen dioxide to the amount of the ammonia source.

17. The machine readable medium of claim 14, comprising instructions to determine the dosing an amount of an ammonia source as a function of a temperature of the diesel engine exhaust, a flow rate of the diesel engine exhaust, and an ammonia coverage of the catalyst.

18. The machine readable medium of claim 14, comprising instructions to determine the amount of nitrogen oxide by determining the amount of nitrogen dioxide and an amount of $NO_x$.

19. The machine readable medium of claim 14, comprising instructions to determine the amount of nitrogen dioxide by determining the amount of nitrogen oxide and an amount of $NO_x$.

20. The machine readable medium of claim 14, comprising instructions to dose an amount of ammonia as a function of the ratio of the amount of nitrogen oxide and the amount of nitrogen dioxide or an absolute amount of nitrogen oxide and an absolute amount of nitrogen dioxide.

* * * * *